United States Patent
Chang

[19]

[11] Patent Number: 6,034,508
[45] Date of Patent: Mar. 7, 2000

[54] BATTERY LIFE EXTENDING POWER-SWITCHING DEVICE FOR ALL-TIME OPERATIONAL SYSTEM

[75] Inventor: Nai-Shung Chang, Yung-Ho, Taiwan

[73] Assignee: VIA Technologies, Inc., Hsin-Tien, Taiwan

[21] Appl. No.: 09/200,331

[22] Filed: Nov. 25, 1998

[30] Foreign Application Priority Data

Jul. 23, 1998 [TW] Taiwan ................................. 87112021

[51] Int. Cl.[7] ....................................................... H02J 7/00
[52] U.S. Cl. ............................................. 320/138; 307/44
[58] Field of Search ................................... 320/110, 126, 320/127, 137, 138, FOR 155; 307/43, 44, 46, 48, 65, 66

[56] References Cited

U.S. PATENT DOCUMENTS

| | | | |
|---|---|---|---|
| 5,187,425 | 2/1993 | Tanikawa | 320/138 |
| 5,287,053 | 2/1994 | Hutchingson | 320/138 X |
| 5,477,126 | 12/1995 | Shiojima | 320/138 |
| 5,617,009 | 4/1997 | Takao et al. | 320/138 |

*Primary Examiner*—Edward H. Tso
*Attorney, Agent, or Firm*—Jiawei Huang; J. C. Patents

[57] ABSTRACT

A power-source-switching device automatically capable of directing power from a battery or an external power source to an all-time circuit. When the external power source is connected, a switching circuit directs the external power source to the all-time circuit. On the other hand, when the external power source is disconnected, the switching circuit is able to direct power from the battery to the all-time circuit. Since the conventional diode connection is replaced by a switching circuit, a voltage drop across the diode due to forward bias is avoided. Consequently, the battery can work at a lower voltage level, thereby extending the working life of a battery.

12 Claims, 2 Drawing Sheets

BATTERY LIFE EXTENDING POWER-SWITCHING DEVICE FOR ALL-TIME OPERATIONAL SYSTEM

CROSS-REFERENCE TO RELATED APPLICATION

This application claims the priority benefit of Taiwan application serial no. 87112021, filed Jul. 23, 1998, the full disclosure of which is incorporated herein by reference.

BACKGROUND OF THE INVENTION

1. Field of Invention

The present invention relates to a power-switching device. More particularly, the present invention relates to a power-switching device capable of directing power from either a battery or an external power source to an all-time operational system such that the working life of the battery can be extended.

2. Description of Related Art

In modern life, we are surrounded by various kinds of electronic products. However, not every one of these electronic products is in use twenty-four hours a day. Nevertheless, for some electronic equipment, part of its internal circuitry may need to be functional even when it is not switched on. For example, the clock circuit within a person computer has to be maintained even when power supply to the entire computer is switched off.

Therefore, the next time the computer is powered up, the clock circuit can still provide accurate time to the computer. In addition, almost all personal computers have memory circuits for storing some important setup parameters. The memory circuit keeps important parameters for operating peripheral devices such as hard disks or floppy disks. At present, the memory circuits and the clock circuit are integrated together on a single chip, known often as the real-time clock (RTC) integrated circuit (IC). In some systems, the RTC IC is even integrated within a silicon chip module for reducing device counts. The aforementioned clock circuit and memory circuit, which must be operational even when the main power supply is cut off, is called an all-time circuit. In other words, an all-time circuit is operational whether surrounding circuits are operational or not.

Since all-time circuits need to remain operational after the main power supply is switched off, two sources of power including an external power source and a battery are normally simultaneously provided. When the external power source is tapped, working power of the all-time circuits is provided by the external power source alone. Consequently, current flow from the battery is reduced to a minimum so that battery power is retained. On the other hand, when main power to the all-time circuit is cut off, the battery takes over and provides all the necessary power for operating the all-time circuit. For example, when a personal computer is switched off, power for operating the RTC IC is provided by an on-board battery.

FIG. 1 is a block diagram showing a conventional circuit connection between an external power source, a battery and an all-time circuit. In FIG. 1, input line VCC is connected to an external power source, and line VBAT is connected to a battery 130. When line VCC is not connected to an external power source, power for operating the all-time circuit 110 is provided by the battery 130. Since the diode 120 is forward biased when an external power supply is absent, the battery 130 is able to supply the necessary power via the line VBAT.

However, when the external power supply is connected to the line VCC, power to the all-time circuit 110 is provided by the external power source. The external power source is able to take over because an external power source generally has a higher voltage than the battery 130. Thus, the diode 120 becomes reverse bias and hence is able to stop any flow of current from the battery 130. Because the recharging of a rechargeable battery may lead to environmental problems, non-rechargeable batteries such as lithium batteries are often used as the background power source. In general, for non-rechargeable batteries, forced charging not only may damage the battery itself, but may also lead to a shortening of its working life. With the diode 120 becoming reverse bias when the external power source is connected, the flow of current from the power line VCC into the battery 130 is prevented.

Although the circuit connection from the external power source and battery as shown in FIG. 1 is able to provide a constant supply of working power for the all-time circuit, potential drop still exists between the terminals of a diode due to a forward bias. Consequently, power stored inside the battery cannot be fully utilized. FIG. 2 is a graph with a curve showing the variation of battery voltage with discharging time. Assuming a brand new battery can provide a maximum voltage of V0, battery voltage gradually drops with time due to discharging.

For example, at time t1, battery voltage has dropped to about V1. There is a certain voltage range for the battery within which the all-time circuit can operate when the external power supply is cut off. However, when the battery voltage has dropped below a limiting value, the all-time circuit does not function. For example, the all-time circuit RTC IC in a personal computer can normally work when a powering voltage higher than 1.8V is provided, but the RTC IC ceases to function below 1.8V. In general, the voltage of a new battery for supplying RTC IC is about 3.0V, that is, V0=3.0V. Supposing a diode has a forward bias drop of about 0.7V when conductive, the RTC IC stops functioning when battery voltage has dropped to about 1.8V+0.7V=2.5V. On the other hand, if the RTC IC is directly connected to the battery instead of indirectly through a diode, the RTC IC is still operational as long as the battery voltage is still above 1.8V.

In FIG. 2, if the battery is connected via a diode and the value of V1, V2 are 2.5V and 1.8V respectively, the RTC IC stops working after t1 because the battery voltage has dropped below 2.5V. However, if the battery is directly connected to the RTC IC instead of via a diode, the RTC IC can still function normally before time t2 at about 1.8V. In other words, without a diode between the battery and the RTC IC, the battery can work an extra period from t1 to t2. If the battery within a personal computer for working the RTC IC has a life of more than two years, the working life of a battery can be extended for a few more months.

In summary, the conventional method of using a diode to provide battery power to an all-time circuit has the disadvantage of producing a voltage drop at the terminals of a diode when the diode is in forward bias. Therefore, the all-time circuit stops operating even when the battery voltage is still above the minimum operating voltage of the all-time circuit. Hence, the battery is not fully utilized.

In light of the foregoing, there is a need to provide a method of extending the working life of a battery.

SUMMARY OF THE INVENTION

Accordingly, the present invention is to provide a power-source-switching device and an all-time circuit such that the working life of a battery can be extended. The switching device replaces the conventional diode connection so that the battery can be more fully utilized.

To achieve these and other advantages and in accordance with the purpose of the invention, as embodied and broadly described herein, the invention provides a switching device capable of directing power from either a battery or an external power source to an all-time circuit so that the working life of the battery is extended. The switching device includes a power-source detection circuit and a switching circuit. The power-source detection circuit is coupled to an external power source to detect whether or not an external power source is present and, depending on the result, a power-source detection signal is sent out. The switching circuit has two input terminals connected to a battery and the external power source, respectively, and a power output terminal for supplying power to external loads. The switching circuit is being controlled by, the power-source detection signal. Depending on the power-source detection signal, either the battery or the external power source provides necessary power to the power output terminal of the switching circuit. When the external power source is present, the external power source is connected to the load supporting power output terminal. On the other hand, when the external power source is cut off, the battery is connected to the load supporting power output terminal.

According to one preferred embodiment of this invention, power for driving the power-source detection circuit and the switching circuit is provided by the load supporting power output terminal of the switching circuit.

In one aspect of this invention, the all-time circuit includes a real-time clock integrated circuit or a memory circuit for storing system parameters. Moreover, the all-time circuit also includes an integrated circuit of the real-time circuit and the memory circuit.

In another aspect, this invention provides an all-time operational system capable of extending working life of a battery. The all-time operational system includes a switching device and an all-time circuit, wherein the switching device further includes a power-source detection circuit and a switching circuit.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
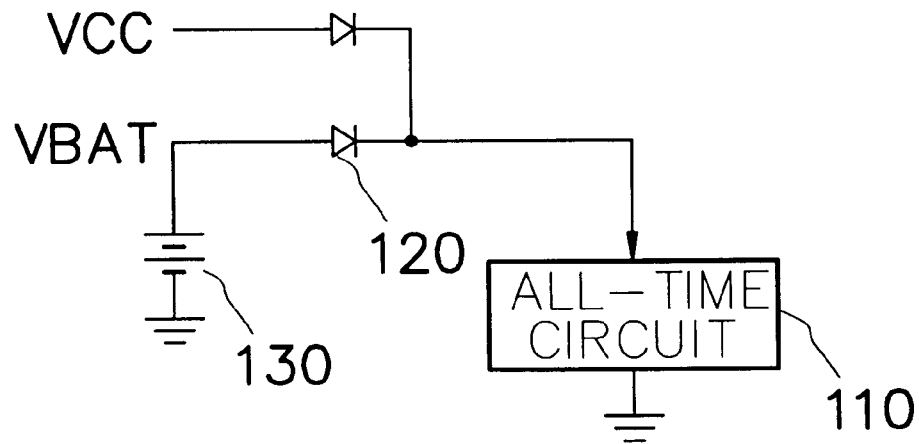
FIG. 1 is a block diagram showing a conventional circuit connection between an external power source, a battery and an all-time circuit.
Figure 2:
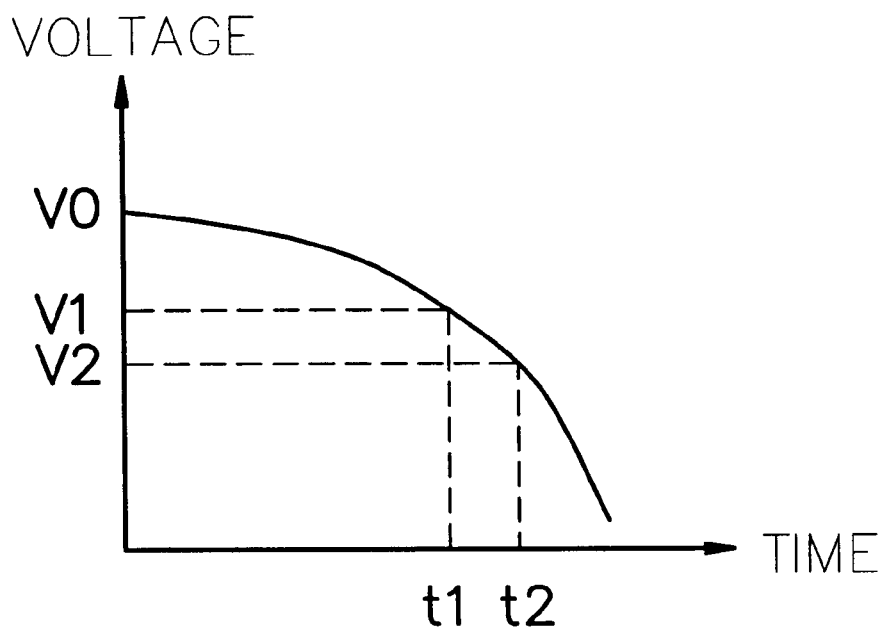
FIG. 2 is a graph with a curve showing the variation of battery voltage with discharging time.

Reference will now be made in detail to the present preferred embodiments of the invention, examples of which are illustrated in the accompanying drawings. Wherever possible, the same reference numbers are used in the drawings and the description to refer to the same or like parts.

Figure 3:
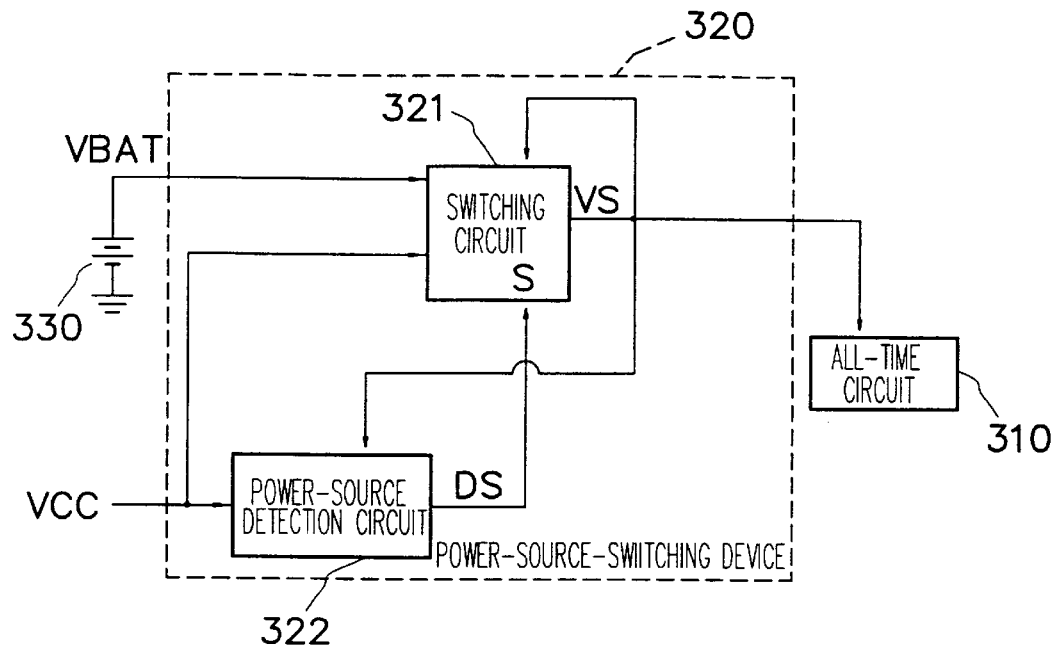
FIG. 3 is a block diagram showing a power-source-switching device connected to an all-time circuit capable of extending the working life of a battery according to a first embodiment of this invention.

FIG. 3 is a block diagram showing a power-source-switching device connected to an all-time circuit capable of extending the working life of a battery according to a first embodiment of this invention. As shown in FIG. 3, a power-source-switching device 320 is provided. The power-source-switching device 320 is connected externally to a battery 330 via line VBAT and to an external power source via line VCC. The power-source-switching device 320 is capable of directing power either from the power source VBAT or the power source VCC to a power output terminal VS for supporting external loads. For example the output terminal VS provides power to an all-time circuit 310.

Internally, the power-source-switching device 320 includes a power-source detection circuit 322 and a switching circuit 321. The power-source detection circuit 322 is coupled to an external power source VCC for detecting whether or not an external power source is provided. A signaling line DS is also present for transmitting signal regarding the status of the power source VCC from the power-source detection circuit 322 to the switching circuit 321. When an external power source is connected to VCC, a source-detecting signal is sent via line DS to the switching circuit 321.

The switching circuit 321 has two power-input terminals respectively connected to the battery source VBAT and the power source VCC, and a power output terminal VS for connecting to external loads. Furthermore, the switching circuit 321 has an input terminal for receiving, source-detecting signal DS so that either battery power VBAT or power source VCC can be directed to the power outlet VS. Because source-detecting line DS is activated when power source VCC is connected to an external power supply, power from the power source VCC is automatically directed to the power outlet VS by the switching circuit 321. On the other hand, the source-detecting line DS is de-activated when no external power source is present, and hence power from the battery VBAT is directed to the power outlet VS by the switching circuit 321.

Since the power-source detection circuit 322 has to monitor connectivity to an external power source VCC at all times, the power-source detection circuit 322 itself is also an all-time circuit. Power for driving the power-source detection circuit 322 comes from the power outlet VS. Furthermore, the switching circuit 321 is also composed of electronic switches. The electronic switches need to be driven by a power source. Consequently, the switching circuit 321 has to be connected to the power outlet VS as well.

Although the power-source detection circuit 322 and switching circuit 321 are both connected to power source VS, which is powered by VCC an when external power source is connected, some current from the battery 330 has to be diverted to the circuits 322 and 321 when the external power source is disconnected. However, most detection and switching circuits are relatively simple and can be driven by very little electric current. Hence, the addition of detection and switching circuit to the all-time circuit does not excessively increase the battery loading.

Figure 4:
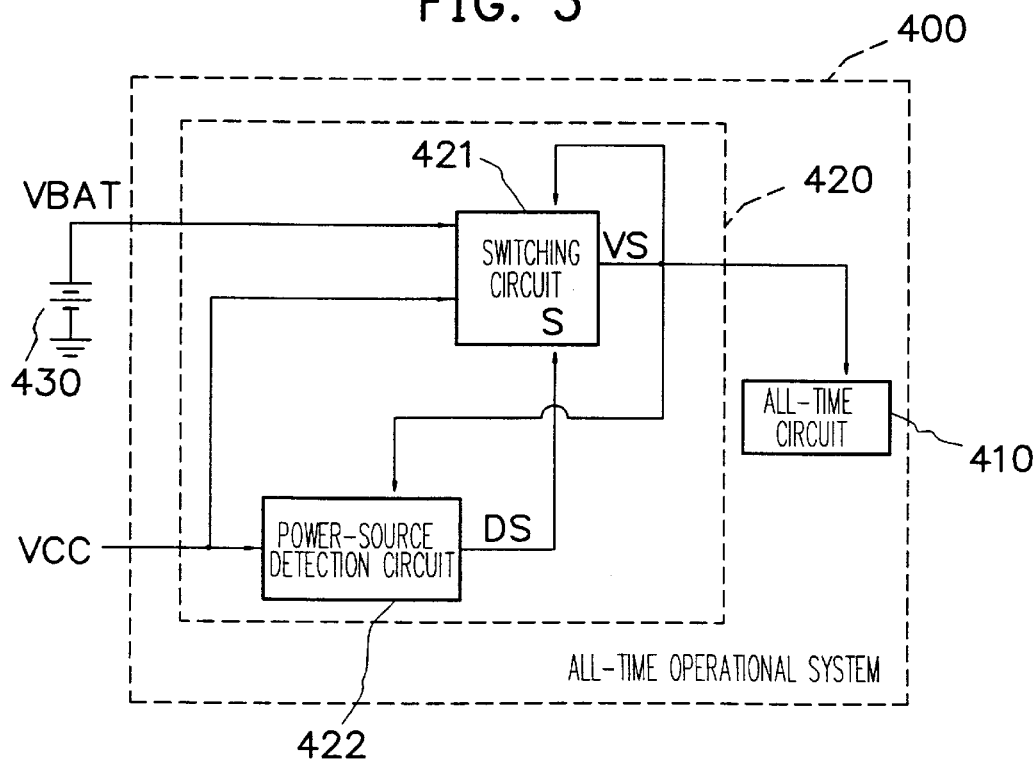
FIG. 4 is a block diagram showing an all-time operational system capable of extending the working life of a battery according to a second embodiment of this invention.

FIG. 4 is a block diagram showing an all-time operational system capable of extending the working life of a battery according to a second embodiment of this invention. In FIG. 4, power required by the all-time operational system 400 is provided by the battery 430 through line VBAT or an external power source through line VCC.

As shown in FIG. 4, the all-time operational system 400 mainly includes an all-time circuit 410 and a power-source-switching installation 420. The power-source-switching installation is equivalent to the power-source-switching device 320 as shown in FIG. 3. The power-source-switching installation 420 includes a power-source detection circuit 422 and a switching circuit 421. The power-source detection circuit 422 is coupled to an external power source VCC for detecting whether or not an external power source is provided. A signaling line DS is also present for transmitting signal regarding the status of the power source VCC from the power-source detection circuit 422 to the switching circuit 421. When an external power source is connected to VCC, a source-detecting signal is sent via line DS to the switching circuit 421.

The switching circuit 421 has two power-input terminals respectively connected to the battery source VBAT and the power source VCC, and a power output terminal VS for connecting to external loads. Furthermore, the switching circuit 421 has an input terminal for receiving source-detecting signal from line DS so that either battery power VBAT or power source VCC can be directed to power outlet VS. Because source-detecting line DS is activated when power source VCC is connected to an external power supply, power from the power source VCC is automatically directed to the power outlet VS by the switching device 421. On the other hand, the source-detecting line DS is de-activated when no external power source is present, and hence power from the battery VBAT is directed by the switching, circuit 421 to the power outlet VS.

The all-time circuit 410 is electrically coupled to the power source outlet VS. Through the power-source-switching installation 420, necessary power for operating the all-time circuit 410 can be obtained from the batter) 430 via line VBAT or an external power source via line VCC. Hence, the all-time circuit 430 is operational at any time.

The all-time circuit 410 can be a real-time clock (RTC) circuit or a memory circuit for storing system parameters. The all-time circuit 410 can even be an integrated circuit of both the RTC circuit and the memory circuit. For example, most RTC circuits in personal computers have a few hundred bits of memory space for storing basic input/output system (BIOS) parameters.

In the all-time operational system 400, besides the need for space to accommodate an all-time circuit 410, additional space is needed to accommodate the switching circuit 421 and the power-source detection circuit 422 of the power-source-switching installation 420. Consequently chip area for accommodating all the circuit elements is increased. However, necessary switching and detection circuits are relatively simple, and hence the additional space required on a silicon chip is negligible.

The aforementioned power-source-switching device and the all-time operational system is capable of extending battery life because the conventional diode connection is replaced by a switching circuit. When no external power source is applied, the switching circuit directs battery power to the all-time circuits. However, unlike a conventional diode connection, which has voltage drop when forward biased, the switching circuit of this invention permits the all-time circuits to remain operational under a lower battery voltage. Hence, the working life of a battery is extended and better utilized. In other words, servicing of the battery can be less frequent, and some maintenance cost can be saved especially when the battery is hidden within a computer console.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power-source-switching device capable of extending the working life of a battery, wherein the power-source-switching device is used to direct power either from a battery or an external power source to an all-time circuit, the device comprising:

a power-source detection circuit coupled to an external power source for detecting whether or not an external power is present, and then outputting a power-source detection signal; and a switching circuit having two input terminals and a load-supporting power output terminal such that the input terminals are respectively connected to the battery and the external power source and the output terminal is connected to the all-time circuit, wherein the switching circuit also has an input terminal for receiving the power-source detection signal from the power-source detection circuit so that when the external power source is applied, the external power source is directed to the load-supporting power output terminal of the switching circuit, and, on the other hand, when the external power source is absent, power from the battery is directed to the load-supporting power output terminal of the switching circuit.

2. The power-source-switching device of claim 1, wherein the battery includes a non-rechargeable battery.

3. The power-source-switching device of claim 1, wherein power for driving the power-source detection circuit is provided by the load-supporting power output terminal of the switching circuit.

4. The power-source-switching device of claim 1, wherein power for driving the switching circuit is provided by the load-supporting power output terminal of the switching circuit itself.

5. The power-source-switching device of claim 1, wherein the all-time circuit includes a real-time clock circuit.

6. The power-source-switching device of claim 1, wherein the all-time circuit includes a memory circuit for storing system parameters.

7. An all-time operational system capable of extending battery life such that power for operating an all-time operational system is provided by a battery or an external power source, the system comprising:

a power-source detection circuit coupled to the external power source for detecting whether an external power is present or not, and then outputting a power-source detection signal;

a switching circuit having two input terminals and a load-supporting power output terminal such that the input terminals are respectively connected to the battery and the external power source, wherein the switching circuit also has an input terminal for receiving the power-source detection signal from the power-source detection circuit so that when an external power source is applied, the external power source is re-directed to the load-supporting power output terminal of the switching circuit, and, on the other hand, when the external power is absent, power from the battery is re-directed to the load-supporting power output terminal of the switching circuit; and an all-time circuit coupled to the power output terminal of the switching circuit so that the all-time circuit can operate continuously by receiving power from either the battery or the external power source.

8. The all-time operational system of claim 7, wherein the battery includes a non-rechargeable battery.

9. The all-time operational system of claim 7, wherein power for driving the power-source detection circuit is provided by the load-supporting power output terminal of the switching circuit.

10. The all-time operational system of claim 7, wherein power for driving the switching circuit is provided by the load-supporting power output terminal of the switching circuit itself.

11. The all-time operational system of claim 7, wherein the all-time circuit includes a real-time clock circuit.

12. The all-time operational system of claim 7, wherein the all-time circuit includes a memory circuit for storing system parameters.

* * * * *